Aug. 22, 1944.   J. P. JOHNSON   2,356,322

COUPLING

Filed March 31, 1943

INVENTOR.
JAMES P. JOHNSON
BY
O. Melbourne Green
Atty.

Patented Aug. 22, 1944

2,356,322

UNITED STATES PATENT OFFICE 2,356,322

COUPLING

James P. Johnson, Shaker Heights, Ohio

Application March 31, 1943, Serial No. 481,237

6 Claims. (Cl. 64—27)

This invention relates to couplings and has for its primary object to provide a flexible coupling unit of improved construction adapted to drivingly connect a drive member and a driven member in such a manner that impulses and vibrations ordinarily transmitted therebetween are effectively absorbed to such an extent that fatigue is eliminated or materially reduced as well as breakage ordinarily due to crystallization of the elements.

Another object of the present invention is to provide a coupling of the type referred to in which a single thrust lug is mounted on one of said members and movable angularly in relatively opposite directions about the axis of rotation of the coupling, which movement is yieldably resisted by a torque actuated spring member and improved means for effecting a positive drive in the event that the spring member becomes broken.

A further object of the present invention is to provide a coupling of the type referred to in which the relatively movable members are so mounted that the life of the coupling is materially increased despite the fact that a one sided drive is employed.

A further object of the present invention is to provide a coupling of the type referred to which by reason of the design and assembly of the various elements permits the formation of a fluid tight structure to contain a lubricant for effectively lubricating the movable parts thus increasing efficiency and the life of the coupling.

A further object of the invention is to provide such a coupling in which cooperating thrust lugs are disposed on opposite sides of the movable thrust lug and secured in a novel manner for unitary operation.

Another object of the present invention is to provide a flexible coupling unit which is simple in construction, efficient in operation, and inexpensive to manufacture and assemble.

With the objects above indicated, and other objects hereinafter explained in view, my invention consists in the construction and combination of elements hereinafter described and claimed.

Referring to the drawing.

Figure 1:
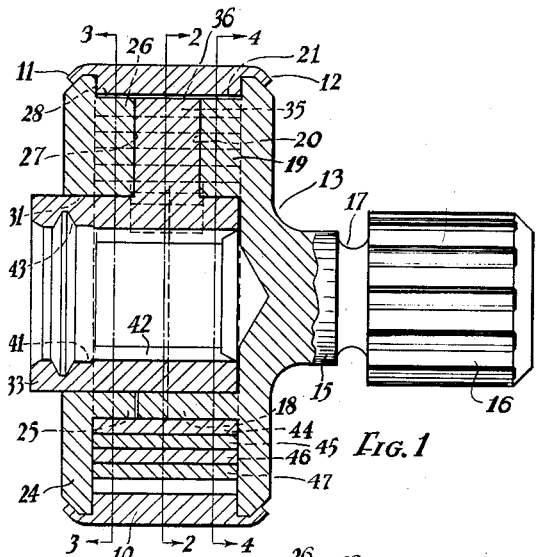
Figure 1 is a longitudinal vertical sectional view taken substantially along line 1—1 in Figure 1 and showing a coupling embodying the present invention.
Figure 2:
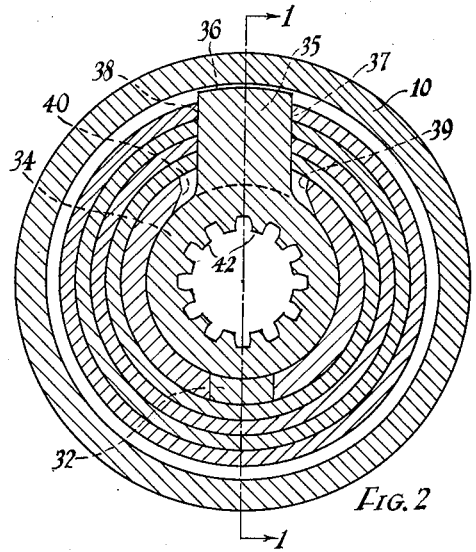
Figure 2 is a transverse sectional view taken substantially along line 2—2 in Figure 1 and showing the normal position of the movable lug.
Figure 3:
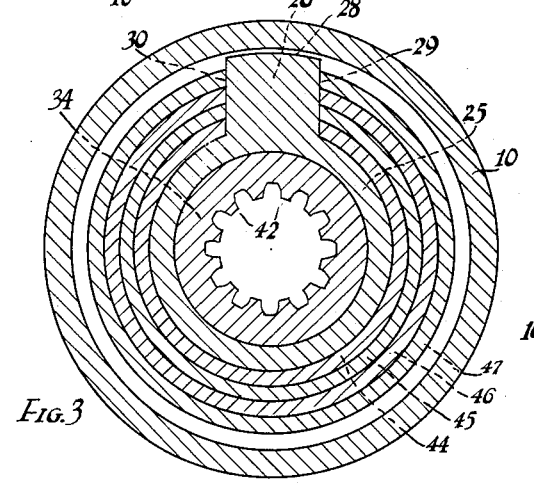
Figure 3 is a transverse sectional view taken substantially along line 3—3 in Figure 1 and showing the normal position of one of the cooperating lugs.
Figure 4:
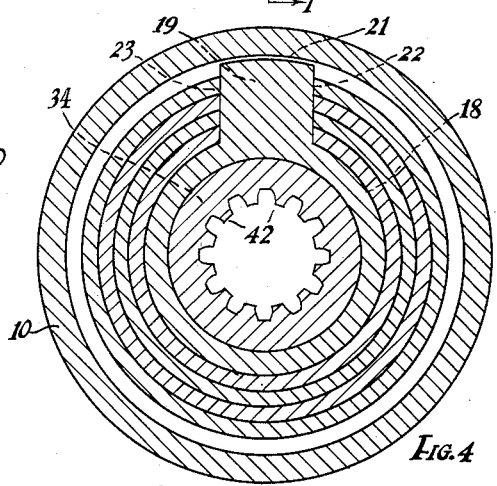
Figure 4 is a transverse sectional view taken substantially along line 4—4 in Figure 1 and showing the normal position of the other cooperating lug.
Figure 5:
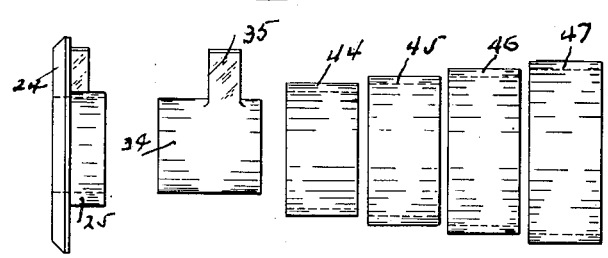
Figure 5 is a longitudinal elevational view with the elements in extended spaced relation in their manner of assembly.

In the drawing, I have illustrated a flexible coupling embodying the present invention and while particularly designed for use in connection with vacuum pumps for aircraft, it will be obvious that the coupling may be otherwise adapted under conditions where similar results are desired.

The coupling is preferably, a self-contained unit which comprises a cylindrical housing 10, of steel or similar material, provided with integral outwardly projecting marginal flanges 11 and 12 disposed relatively on diametrically opposite sides. A drive member 13, of steel or similar material, comprises an end plate 14 snugly fitted within the flange 12 and in abutting engagement with the adjacent end of the housing. An integral extension 15 projects axially outward from the end plate 14 and its outer free end is formed with a pinion 16, of any suitable diameter, adapted for driving connection with a suitable driving course such as the aircraft engine or the like. Adjacent the inner end of the pinion a shear portion 17 is provided, in any desirable manner, and preferably by forming a peripheral groove of reduced cross-sectional area to afford a breaking point in the event of mechanical overload in the system. An integral tubular extension 18 projects axially inward from the inner side of the end plate 14 and is in spaced relation with respect to the inner peripheral surface of the cylindrical housing 10. An integral thrust lug 19 also projects inwardly from the inner side of the end plate 14, its end face 20 terminating in a plane substantially perpendicular to the axis of rotation and short of the end of the tubular extension 18. The lug 20, of any desirable size, projects radially outward from the tubular extension 18 and has its outer end 21 formed to the curvature of the cylindrical housing 10 with which it abuts and its opposite side faces 22 and 23 flat and spaced apart relatively in parallel relation.

A second end plate 24, of steel or similar material, is snugly fitted within the flange 11 at the opposite end of the housing 10 and in abutting engagement with the adjacent end of the latter. An integral tubular extension 25, similar to the extension 18, projects axially inward from the inner side of the end plate 24 and is in spaced relation with respect to the inner peripheral surface of the cylindrical housing 10 to provide an annular chamber for a purpose to be later described, the inner adjacent ends of the extensions being in abutting engagement. An integral thrust lug 26, also projects inwardly from the inner side of the end plate 24, its end face 27 terminating in a plane substantially perpendicular to the axis of rotation and short of the end of the tubular extension 25. The lug 26, of substantially the same shape as and in longitudinal alignment with the lug 20, projects radially outward from the tubular extension 25 and has its end 28 formed to the curvature of the cylindrical housing 10 with which it abuts and its opposite side faces 29 and 30 flat and spaced apart relatively in parallel relation. The end plate 24 is provided with an axially disposed opening 31 extending transversely through the former and of the same diameter as the inner periphery of the extension 25 with which it communicates for a purpose to be later described. To insure maintaining the thrust lugs 20 and 26 in proper relative alignment, the inner adjacent ends of the tubular extensions 18 and 25 are provided with engaging tongue and groove means 32 so positioned as to prevent relative angular movement about the axis of rotation and preferably positioned diametrically opposite to the lugs.

A driven member 33, of steel or similar material, comprises a circular hub portion 34 disposed coaxially within the aligned tubular extensions 25 and 18 and adapted for slight angular movement in opposite directions about the axis of rotation of the coupling. In as much as the present coupling is of the one sided drive type, the problem of wear is of primary importance and to obtain a materially greater length of life, the circular hub portion 34 is made with a contacting bearing surface substantially throughout its entire enclosed length. This is an important feature of the construction which has been satisfactorily proven by tests. An integral thrust lug 35 projects radially outward from the hub portion 34 and is disposed between and normally in longitudinal alignment with the thrust lugs 20 and 26. The lug 35, substantially the same shape as the lugs 20 and 26, has its outer end 36 formed to the curvature of the cylindrical housing 10 and its opposite side faces 37 and 38 flat and spaced apart relatively in parallel relation. The tubular extensions 18 and 24 are slotted at 39 and 40 on diametrically opposite sides adjacent the lug 35 to predeterminately limit the relative angular movement of the latter and to afford a positive mechanical drive in the event of breakage.

The outer end of the hub 33 is provided with a bore 41 extending axially inward adapted to receive the end of a pump shaft, not shown, and internal splines 42 are formed at the inner portion of the bore 41 for cooperative engagement with like splines on the pump shaft to insure unitary rotation. To prevent accidental relative axial movement of the pump shaft and hub portion 33, a circumferential groove 43 is formed on the wall of the bore to removably receive a snap ring, not shown, operatively associated in the customary manner.

Any suitable means for effecting a flexible drive between the drive and driven members may be adopted but a simple and highly efficient means is illustrated in the drawing. A plurality of resilient split spring rings 44, 45, 46, and 47 are positioned relatively in concentric nested relation and disposed within the annular chamber in encircling relation about the tubular extensions 18 and 24, the inner spring 44 being engageable with the extensions. The springs extend longitudinally between the end plates 14 and 24 and their free ends are so spaced apart relatively as to engage adjacent end faces of the thrust lugs when the latter are in neutral or aligned positions. With the springs arranged as described, relative angular movement of the drive member with respect to the driven member about their axis causes the lug 35 to be moved in one direction which movement is yieldably resisted by the cooperating springs. A reverse action takes place when the drive and driven members operate in an opposite direction thereby providing a flexible drive coupling capable of operation in either direction of rotation without the necessity of replacement of parts or reversal of the elements. In the event that the springs should break or otherwise lose their resiliency a positive drive is effected when the lug 35 moves into abutment with either of the walls provided by the recesses 39 and 40. When the elements of the coupling are assembled in the manner shown and described, the flanges 11 and 12 on the housing 10 can be bent over securely into engagement with the respective end plates providing a fluid tight enclosure capable of maintaining a suitable lubricant to best lubricate the relatively movable parts thereby adding further to the life and efficiency of the coupling.

In operation, the coupling is connected to the vacuum pump rotor, in the manner heretofore described and the pinion is drivingly connected with a power source, such as the aircraft engine. Impulses and vibrations ordinarily transmitted from the engine are effectively absorbed or materially reduced by the yieldability of the spring member upon relative angular movement of the drive and driven members. While the one sided drive ordinarily results in wear on one side of the elements, this disadvantage is remedied by providing a substantially continuous bearing surface for the revolvable hub 33 thereby so distributing the load that materially greater efficiency is obtained despite the unbalanced condition of the drive. Actual tests have proven this coupling to outperform anything of a similar character now available which in aircraft adaptation is of primary importance.

While I have described the preferred embodiment of the invention it is to be understood that I am not to be limited thereto, inasmuch as changes and modifications may be resorted to without departing from the spirit of the invention as defined in the appended claims.

What is claimed is:

1. A flexible coupling comprising; a hollow cylindrical housing; a pair of end plates disposed at the opposite ends of said housing and securely connected to the latter, said end plates being provided with tubular extensions projecting axially inward and relatively in longitudinal alignment, the inner adjacent ends of said extensions being in abutting engagement, said end plates being further provided with thrust lugs which project inwardly therefrom but radially outward from the adjacent extension, said thrust lugs being spaced apart relatively but in longitudinal alignment; cooperating means on said extensions for preventing relative angular movement therebetween and for maintaining alignment of said thrust lugs; a hub-like member mounted for oscillatory movement in said extensions in such a manner as to afford suitable bearing substantially throughout the entire enclosed surface of said hub member, said hub member being provided with a thrust lug which projects radially outward therefrom and is disposed between and normally in longitudinal alignment with the aforesaid thrust lugs; and an axially split spring steel ring positioned within said housing and in encircling relation about said extension, the ends of said spring being resiliently engageable with adjacent portions of the normally aligned thrust lugs whereby opposite angular movement between said plate thrust lugs and the hub thrust lug is yieldably afforded.

2. A flexible coupling comprising; a hollow cylindrical housing; a pair of end plates disposed at the opposite ends of said housing and securely connected to the latter, said end plates being provided with tubular extensions projecting axially inward and relatively in longitudinal alignment, the inner adjacent ends of said extensions being in abutting engagement, said end plates being further provided with thrust lugs which project inwardly therefrom but radially outward from the adjacent extension, said thrust lugs being spaced apart relatively but in longitudinal alignment; cooperating means on said extensions for preventing relative angular movement therebetween and for maintaining alignment of said thrust lugs; a hub-like member mounted for oscillatory movement in said extensions in such a manner as to afford suitable bearing substantially throughout the entire enclosed surface of said hub member, said hub member being provided with a thrust lug which projects radially outward therefrom and is disposed between and normally in longitudinal alignment with the aforesaid thrust lugs; and an axially split spring steel ring positioned within said housing and in encircling relation about said extension, the ends of said spring being resiliently engageable with adjacent portions of the normally aligned thrust lugs whereby opposite angular movement between said plate thrust lugs and the hub thrust lug is yieldably afforded; the tubular extensions being slotted on opposite sides and adjacent said hub lug to afford stops which predeterminately limit the opposite angular movement of the hub member.

3. A flexible coupling comprising; a hollow cylindrical housing; a pair of end plates disposed at the opposite ends of said housing and securely connected to the latter, said end plates being provided with tubular extensions projecting axially inward and relatively in longitudinal alignment, the inner adjacent ends of said extensions being in abutting engagement, said end plates being further provided with thrust lugs which project inwardly therefrom but radially outward from the adjacent extension, said thrust lugs being spaced apart relatively but in longitudinal alignment; cooperating tongue and groove means provided at the abutting ends of said tubular extensions for preventing relative angular movement therebetween and disposed diametrically opposite with respect to said lugs for maintaining the latter in longitudinal alignment; a hub-like member mounted for oscillatory movement in said extensions in such a manner as to afford suitable bearing substantially throughout the entire enclosed surface of said hub member, said hub member being provided with a thrust lug which projects radially outward therefrom and is disposed between and normally in longitudinal alignment with the aforesaid thrust lugs; and an axially split spring steel ring positioned within said housing and in encircling relation about said extensions, the ends of said spring being resiliently engageable with adjacent portions of the normally aligned thrust lugs whereby opposite angular movement between the end plate thrust lugs and the hub thrust lug is yieldably afforded.

4. A flexible coupling comprising; a hollow cylindrical housing having outwardly projecting marginal flanges at its opposite ends; a pair of end plates disposed within said flanges and in abutment with the adjacent portion of said housing, the free ends of said flanges being bent into engagement with its respective end plate for unitarily securing the same; said end plates being provided with tubular extensions projecting axially inward and relatively in longitudinal alignment, the inner adjacent ends of said extensions being in abutting engagement, said end plates being further provided with thrust lugs which project inwardly therefrom but radially outward from the adjacent extension, said thrust lugs being spaced apart relatively but in longitudinal alignment; cooperating means on said extensions for preventing relative angular movement therebetween and for maintaining alignment of said thrust lugs; a hub-like member mounted for oscillatory movement in said extensions in such a manner as to afford suitable bearing substantially throughout the entire enclosed surface of said hub member, said hub member being provided with a thrust lug which projects radially outward therefrom and is disposed between and normally in longitudinal alignment with the aforesaid thrust lugs; and an axially split spring steel ring positioned within said housing and in encircling relation about said extensions, the ends of said spring being resiliently engageable with adjacent portions of the normally aligned thrust lugs whereby opposite angular movement between the end plate thrust lugs and the hub thrust lug is yieldably afforded.

5. A flexible coupling comprising; a hollow cylindrical housing; a pair of end plates disposed at the opposite ends of said housing and securely connected to the latter, said end plates being provided with tubular extensions projecting axially inward and relatively in longitudinal alignment, the inner adjacent ends of said extensions being in abutting engagement, said end plates being further provided with thrust lugs which project inwardly therefrom but radially outward from the adjacent extension, said thrust lugs being spaced relatively but in longitudinal alignment; means for preventing relative angular movement between said lugs and positioned remotely from the latter; a hub-like member mounted for oscillatory movement in said extensions in such a manner as to afford suitable bearing substantially throughout the entire enclosed surface of said hub member, said hub member being provided with a thrust lug which projects radially outward therefrom and is disposed between and normally in longitudinal alignment with the aforesaid thrust lugs; and an axially split spring steel ring positioned within said housing and in encircling relation about said extensions, the ends of said spring being resiliently engageable with adjacent portions of the normally aligned thrust lugs whereby opposite angular movement between the end plate thrust lugs and the hub thrust lug is yieldably afforded.

6. A flexible coupling comprising; a hollow cylindrical housing; a pair of end plates disposed at the opposite ends of said housing and securely connected to the latter, said end plates being provided with tubular extensions projecting axially inward and relatively in longitudinal alignment, the inner adjacent ends of said extensions being in abutting engagement, said end plates being further provided with thrust lugs which project inwardly therefrom but radially outward from the adjacent extension, said thrust lugs being spaced apart relatively but in longitudinal alignment; cooperating means on said extensions for preventing relative angular movement therebetween and for maintaining alignment of said thrust lugs; a hub-like member mounted for oscillatory movement in said extensions in such a manner as to afford suitable bearing substantially throughout the entire enclosed surface of said hub member, one of said end plates being provided with an axial opening through which the adjacent end of said hub member projects to afford connection with a pump shaft, said hub member being provided with a thrust lug which projects radially outward therefrom and is disposed between and normally in longitudinal alignment with the aforesaid thrust lugs; and an axially split spring steel ring positioned within said housing and in encircling relation about said extensions, the ends of said spring being resiliently engageable with adjacent portions of the normally aligned thrust lugs whereby opposite angular movement between the end plate thrust lugs and the hub thrust lug is yieldably afforded.

JAMES P. JOHNSON.